United States Patent [19]
Hill et al.

[11] Patent Number: 5,174,167
[45] Date of Patent: Dec. 29, 1992

[54] LINEAR ACTUATOR WITH POSITIVE STOP

[75] Inventors: Jason J. Hill; Mark S. Amalfitano, both of St. Louis, Mo.

[73] Assignee: Emerson Electric Co., St. Louis, Mo.

[21] Appl. No.: 811,719

[22] Filed: Dec. 20, 1992

Related U.S. Application Data

[63] Continuation of Ser. No. 578,566, Sep. 6, 1990.

[51] Int. Cl.⁵ ........................ F16H 29/20; F16H 1/20; B60N 2/02
[52] U.S. Cl. ............................ 74/89.15; 74/424.8 R; 297/330
[58] Field of Search ...................... 74/89.15, 424.8 R; 297/330

[56] References Cited

U.S. PATENT DOCUMENTS

| | | | |
|---|---|---|---|
| 2,966,070 | 12/1960 | Wise | 74/424.8 R |
| 3,178,957 | 4/1965 | Martens | 74/424.8 R |
| 3,200,664 | 8/1965 | Mauric | 74/424.8 R |
| 3,277,736 | 10/1966 | Goodman | 74/424.8 R |
| 3,587,796 | 6/1971 | Nestvogel | 192/8 R |
| 4,000,664 | 1/1977 | Christensen | 74/424.8 R |
| 4,614,128 | 4/1986 | Fickler | 74/89.15 X |
| 4,679,451 | 7/1987 | Nakamura | 74/424.8 R |
| 4,909,569 | 3/1990 | Gaffney | 297/330 |
| 4,934,203 | 6/1990 | Bailey et al. | 74/89.15 |
| 5,002,172 | 3/1991 | Stringer | 74/89.15 X |

Primary Examiner—Allan D. Herrmann
Assistant Examiner—Julie Krolikowski
Attorney, Agent, or Firm—Polster, Lieder, Woodruff & Lucchesi

[57] ABSTRACT

An improvement to a linear actuator (9) having a lead screw (15) received in a drive tube assembly (17) is provided in the form of a bushing (41) mounted on the end of the screw. The outer dimension of the bushing generally corresponds to the inner dimension of the tube. The bushing has a recess (53) formed in one face to accommodate a washer (55). A retaining ring (59) holds the bushing in place. The bushing serves both to prevent contact between the lead screw and tube to reduce noise during actuator operation, and as a positive stop to prevent disengagement of the lead screw from the drive tube assembly.

2 Claims, 2 Drawing Sheets

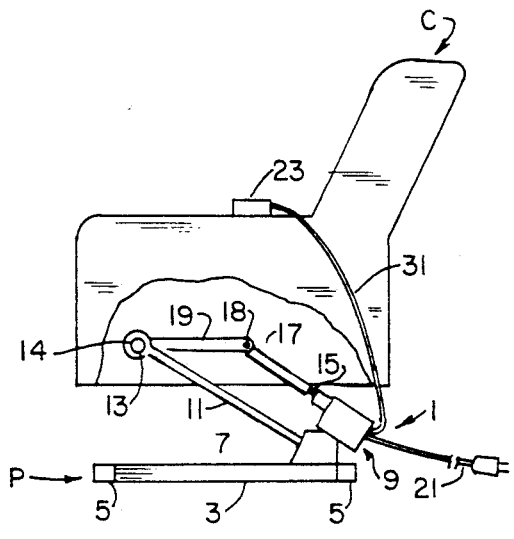
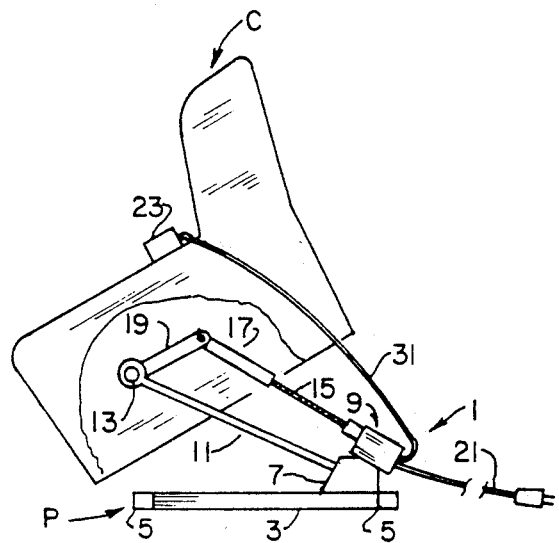
FIG. 1A.  FIG. 1B.
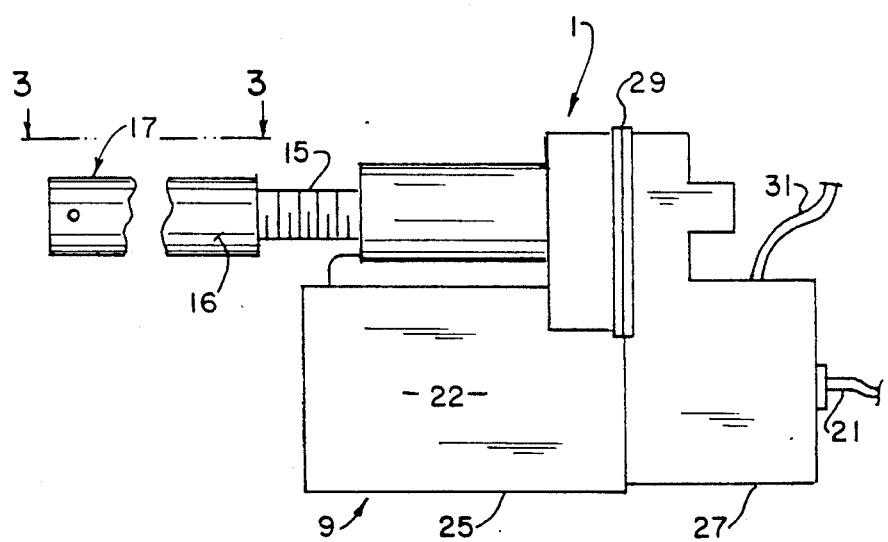
FIG. 2.

LINEAR ACTUATOR WITH POSITIVE STOP

This is a continuation of copending application Ser. No. 07/578,566, filed on Sep. 6, 1990.

BACKGROUND AND SUMMARY OF THE INVENTION

This invention relates to linear actuators and more particularly, to an improvement to such an actuator for providing noise free operation and for positively stopping a lead screw to which it is attached. While the invention is described with respect to its application in a lift chair, those skilled in the art will recognize the wider applicability of the invention.

Linear actuators are well known in the art and have a variety of uses. Typically, the actuator includes a reversible motor, a threaded, elongate lead screw, and a gear mechanism for rotating the screw in an appropriate direction depending upon motor rotation. In certain applications the screw is connected to a member which, in turn, moves in a desired direction as the lead screw turns in one direction or the other. One such member, for example, is a tube having a nut at one end through which the lead screw is threaded. The linear direction of tube movement is thus relative to the direction of screw rotation. It is possible, particularly in long tubes, for the end of the screw threaded through the nut to contact the inner surface of the tube during actuator operation. While such contact does not render the mechanism inoperative, it does make it noisy. Such noise is a nuisance and undesirable in applicational use.

In addition, linear actuators typically are equipped with limit switches which act to disrupt power to the motor when either extreme of directional movement of the tube along the screw is reached. Occasionally, these switches fail or are mis adjusted. If the motor is rotating the screw in the appropriate direction at the time of such limit malfunction, it is possible for the tube to be completely backed off of the lead screw. When this happens, the mechanism to which the tube is connected fails. If the mechanism is being used, for example, in a lift chair, i.e. a chair that can be raised and lowered to facilitate someone getting into and out of it, the result could be injury to the user.

Heretofore, various approaches have been made to attempt to resolve these problems. For example, in U.S. Pat. Nos. 3,587,796 to Nestvogel, and 3,277,736 and 3,277,737 to Goodman, pins and/or bolts and washers are attached to the end of a lead screw positioned in a tube. While the pin and washer do effect a stop, they have certain drawbacks. If they contact or scrape along the inner wall of the tube, they produce noise. They can be knocked loose and displaced. Also, use of the pins requires a drilling operation as part of the manufacturing process which increases product cost. The bolt and washer require drilling and tapping. All of these operations must be accomplished after assembly of the screw in the tube, making the construction difficult and expensive.

Therefore, it is an object of the present invention to provide an improved but low cost linear actuator mechanism used with a tube guide or the like in which one end of the lead screw is inserted.

It is also an object of the invention to provide a linear actuator wherein contact between the screw and the tube is prevented so to provide for relatively noiseless operation of the mechanism.

It is a further object of the invention to provide a linear actuator which is manufactured without requiring drilling or tapping operations, thus providing a simplified solution to the problem of noise while providing a positive, physical stop for the mechanism.

In addition, it is an object of the invention to provide a safety feature on lift chairs or the like so to insure safe operation of the chair.

In accordance with this invention, generally stated, a linear actuator mechanism is provided having a lead screw connected to a drive tube so one end of the screw is received within the tube. A reversible motor selectively rotates the screw in one direction or the other with the length of the screw within the tube increasing or decreasing depending upon which direction the screw is rotated. A bushing is attached to the end of the screw received in the tube. The bushing serves first to prevent the end of the screw from contacting the inside of the tube to eliminate noise during actuator operation; and second, as a positive stop to prevent the lead screw from being inadvertently run out of the end of the tube. The bushing mounts on the screw and one face of the bushing has a recess formed in it which a washer is sized to fit. The washer supports the bushing, enabling the bushing to provide the positive stop. A retainer ring is also installed on the screw to attach the bushing to the lead screw. The entire lead screw assembly is accomplished externally of the tube.

Other objects and features will be in part apparent and in part pointed out hereinafter.

BRIEF DESCRIPTION OF THE DRAWINGS

FIGS. 1A and 1B are views of a chair, partially broken away, showing one illustrative embodiment of linear actuator mechanism of the present invention.

FIG. 2 is an elevational view of a linear actuator used in the device shown in FIG. 1;

Corresponding reference characters indicate corresponding parts throughout the drawings.

DESCRIPTION OF A PREFERRED EMBODIMENT

Figure 3:
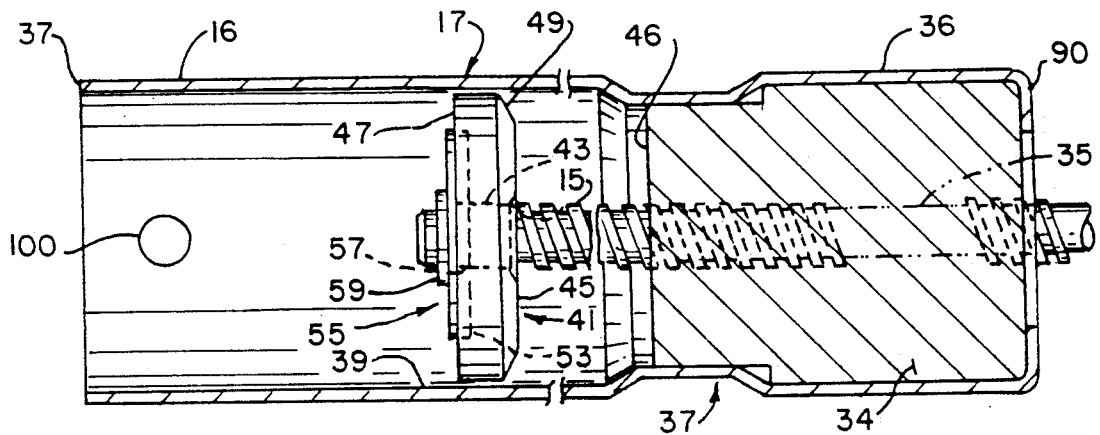
FIG. 3 is a view partly in section and partly broken away showing our improved mechanism.
Figure 4A:
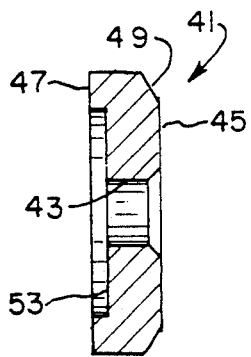
FIG. 4a and 4b are respective side and front elevational views of a bushing shown in FIG. 3, the side view being in section; and, FIG. 5a and 5b are respective side and front elevational views of a washer used with the bushing, the side view being in section.
Figure 4B:
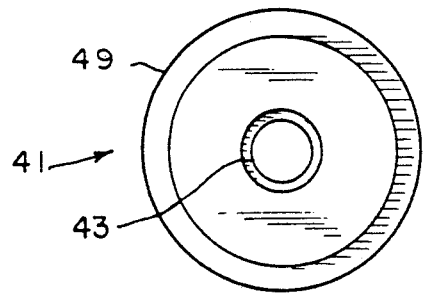
Figure 5A:
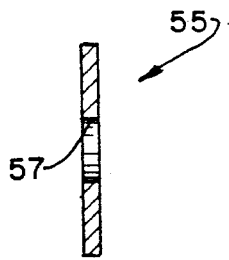
Figure 5B:
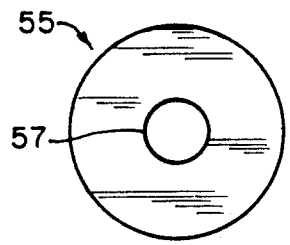

Referring to the drawings, a lift chair for use by, for example, the infirmed or physically handicapped is indicated generally by the reference letter C. The chair C is adapted to ease the task of someone getting into and out of it. For this purpose, the chair is movable from the horizontal chair position shown in FIG. 1A to the tilted and raised position shown in FIG. 1B. A person wishing to rise from the chair first moves it to its FIG. 1B position. When someone is sitting in the chair, or it is not in use, it is moved to its FIG. 1A position.

Movement of chair between the two positions is accomplished by use of a linear actuator mechanism indicated generally by the reference numeral 1. The chair C includes a pedestal P having longitudinal and lateral elements 3 and 5 respectively. A vertical support 7 is positioned at the back end of each longitudinal element (only one of which is shown in the drawings). A linear actuator 9 is mounted to one vertical support 7. A pair of rods 11 (only one of which is shown in the drawings) each have one end attached to one of the vertical supports. The other end of each rod is connected to a cross member 13 a a pivot 14.

A lead screw, or acme screw, 15 of actuator 9 has one end threadably received in a portion of a drive tube assembly 17. The drive tube assembly 17 includes a tube 16. The upper end of the tube 16, which preferably is made of metal, is hingedly attached to a lever arm 19 at a pivot 18. The arm 19 in turn, is connected to the cross member 13. The linear actuator 9 has a power cord 21 for plugging into an electrical outlet (not shown). A conveniently located user operated switch 23 allows a person using the chair to turn a reversible electric motor, generally indicated by the reference numeral 22, of the linear actuator "on" and "off". The switch 23 also allows the user to have the motor 22 run in either direction to extend or retract the screw 15 in the tube 16. When retracted, the chair is in its FIG. 1A position. When extended, tube 16 acts to pivot arm 19 in the counterclockwise (CCW) direction shown in FIG. 1B to tilt the chair.

Referring to FIG. 2, linear actuator 9 includes a first housing section 25 and a second housing section 27 which are joined together at 29 by any conventional method. In addition to the motor 22 enclosed within the housing, the linear actuator also includes a gear train (not shown) by which rotation of the motor is converted to appropriate rotary movement of the lead screw and linear movement of the tube 16. As indicated above, in addition to the power cord for the actuator, a control line 31 from switch 23 also enters housing section 27.

The present invention is best shown in FIG. 3. Drive tube 16 is hollow, tubular member having a first end 36 and a second end 37. As shown in FIGS. 1A and 1B, the end 37 of the tube 16 is attached to lever arm 19. An opening 100 is formed in the end 37 to permit such attachment.

A nut 34 having a longitudinal, central threaded opening 35 extending there through is captured in the other end 36 of the tube 16. The nut 34, which has an outer diameter generally corresponding to the inner diameter of the tube 116 is inserted through the end 37 of the tube 16 in the final stages of the manufacturing process of the drive tube assembly 17. As shown in FIG. 3, the tube 16 is formed with a closed portion 90 along the end 36. The nut 34 and lead screw 15 are inserted in the tube 16 from the end 37 side until the nut 34 abuts portion 90. The tube 16 is then "pinched" or crimped about the diameter of the nut, as indicated at 37, to lock the nut 34 in place. Opening 35 through the nut is sized so that the free end of the lead screw is threadably received therein such that rotary motion of the screw draws the tube 16 either further onto the lead screw or backs off of it. For the application shown in connection with the chair C, the length of tube 16 may, for example, be 16 inches (40.6 cm). Over time, as wear occurs, enough play between the nut 34 and lead screw may occur so that as the tube 16 is drawn further onto the screw 15, the outer or free end of the screw 15 can contact an inner wall 39 of the tube. Because acme screw 15 is made of metal, the metal-to-metal contact between the end of the screw and the tube's inner wall will result in a noisy operation of the mechanism which may be bothersome to the user. The lead screw also may "score" or gouge the tube wall weakening it. Importantly, the lead screw may be bent which could cause the mechanism to lock-up or otherwise malfunction. As will be appreciated by those skilled in the art, the actuator 1 conventionally has limit switches (not shown) associated with it to stop the motor at either extreme of actuator operation. Were, for example, a limit switch to fail during the movement of tube in the direction extracting the tube from the lead screw, the tube would be drawn off the lead screw. This would render the mechanism inoperative.

Previous attempts to resolve these problems have included drilling the end of the screw to receive a pin. The pin extends radially outwardly from the screw to engage the nut or end wall of the tube. Such an arrangement is shown in U.S. Pat. Nos. 3,277,736, 3,227,727 and 3,587,796. Use of a pin can keep a lead screw from being drawn out of a guide tube. It may also even keep the end of the screw from contracting the tube wall. However, pins are prone to breakage and so may not only not prevent extraction of the lead screw; but, also, a broken pin may cause jamming or otherwise interfere with operation of the mechanism. Also, the pin can score the inside of the tube and deform and weaken it. Importantly, the proper location of the pin often cannot be determined until after the drive tube assembly 17 is at least partially constructed. That is to say, the operations required for proper pin placement are accomplished after assembly of the screw 15, nut 34 placement in the tube 16. Such construction methods are expensive and time consuming.

We modify the drive assembly 17 by the use of a bushing 41 which is installed on the screw 15 prior to inclusion in the tube assembly 17 mechanism. The bushing is preferably of a resilient synthetic resin material such as a polyurethane. It has a longitudinal central opening 43, permitting the bushing to be installed on the end of lead screw 15. The bushing has a face 45 which contacts an inner end wall 46 of nut 34 when the bushing is drawn against it. The bushing also has an outer face 47. The edge of the face 14 is chamfered or beveled, as indicated at 49. This beveling provides clearance for the bushing with the tube crimp when face 45 contacts face 46 of nut 34.

A circular recess 53 is formed in outer face 47 of the bushing, this recess being centered about the longitudinal axis of the bushing. A washer 55 is sized to fit in this recess, the washer having an outer diameter corresponding to that of the recess. Washer 55 has a central opening 57 through it permitting insertion of the washer 55 on the screw 5. After the bushing and washer are installed on the lead screw, a retaining ring 59 is installed thereon. Ring 59 is a locking type ring that remains in place and prevents leftward movement of the bushing/washer assembly (as viewed in FIG. 3) when screw rotation is such as to extract the lead screw from the tube 16.

As shown in FIG. 3, the outer diameter of bushing 41 generally corresponds to the inner diameter of tube 16. This prevents movement of the end of the lead screw toward the sidewall of the tube regardless of how far the tube is drawn onto the screw. Since the bushing is of a non-metallic material, any contact between it and the sidewall is relatively noiseless. Further, there is no damage caused to the lead screw by such contact. When screw rotation is in the direction to draw the tube off the screw, the force exerted by the bushing assembly on the nut is sufficient to overcome the force created by the linear actuator trying to withdraw the lead screw from the tube. Thus the assembly acts as a positive stop preventing further movement of the tube.

Lastly, use of the present invention eliminates the drilling or drilling and tapping operations previously formed on the end screw to insert a pin into the end of the screw or bolt and washer into the end. As discussed above, use of the pin also prevented the screw from being withdrawn from the guide tube. Elimination of the pin and these operations lowers the overall cost of the mechanism.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In a linear actuator having a lead screw threadably connectable to a drive tube assembly whereby one end of the screw is received within the tube, and a reversible motor operatively connected to the lead screw for selectively rotating the lead screw in one direction or another whereby the length of the tube drawn onto the lead screw increases or decreases depending upon the direction in which the screw is rotated, the improvement comprising means attachable to the end of the screw received in the tube for preventing contact between the lead screw along the inside of the tube, and for providing a positive stop to prevent disengagement of the tube from the lead screw, said means including a bushing having a central opening there through, the diameter of said opening permitting mounting of said bushing on the lead screw, said bushing having an outer diameter sufficient to support the screw along the inner diameter of the tube, said bushing having a first and second face, one of said first and second faces having a recess formed therein, a washer sized to fit in the recess and a retaining ring fitted to the outer end of the lead screw for holding the bushing on the lead screw to provide a positive stop when the bushing contacts the end of the tube assembly to prevent further movement of the lead screw and tube assembly relative to one another wherein the inner face of the bushing is chamfered about its radially outer edge.

2. In a linear actuator having a lead screw threadably connectable to a drive tube assembly wherein one end of the screw is received within the tube, the tube having a crimp formed in it during assembly of the actuator, and a reversible motor operatively connected to the lead screw for selectively rotating the lead screw in one direction or another whereby the length of tube drawn onto the lead screw increases or decreases depending upon the direction in which the screw is rotated, the improvement comprising means attachable to the end of the screw received in the tube for preventing contact between the lead screw and the inside of the tube thereby to reduce noise and prevent damage to the tube or the lead screw, and for providing a positive stop to prevent disengagement of the tube from the lead screw, said means including a bushing having a central opening therethrough, the diameter of which corresponds to the lead screw diameter, so as to permit the bushing to be received on the lead screw, and an outer diameter sufficient to support the screw along the inner diameter of the tube when the bushing is installed in the tube,; said bushing having an outer face and and inner face, the inner face of the bushing being chamfered about its radially outer edge, said chamber permitting the bushing to seat against the crimp formed in said tube, a washer sized for mounting on the lead screw and positioned to abut the bushing along its outer face, and a retaining ring fitted on the outer end of the lead screw for holding the bushing and the washer on the lead screw to provide a positive stop for said assembly.

* * * * *

UNITED STATES PATENT AND TRADEMARK OFFICE
CERTIFICATE OF CORRECTION

PATENT NO. : 5,174,167

DATED : Dec. 29, 1992

INVENTOR(S) : Jason J. Hill and Mark S. Amalfitano

It is certified that error appears in the above-identified patent and that said Letters Patent is hereby corrected as shown below:

```
On the title page, Item [22]:
   The filing date, now "Dec. 20, 1992"
   should be -- December 20, 1991 --

In claim 2, column 6, line 33, now "chamber"
   should be -- chamfer --
```

Signed and Sealed this

Eighteenth Day of January, 1994

Attest:

BRUCE LEHMAN

*Attesting Officer*   *Commissioner of Patents and Trademarks*